Aug. 17, 1948.  W. E. AMBERG  2,447,045
ICE-CREAM CONE
Filed Dec. 22, 1947
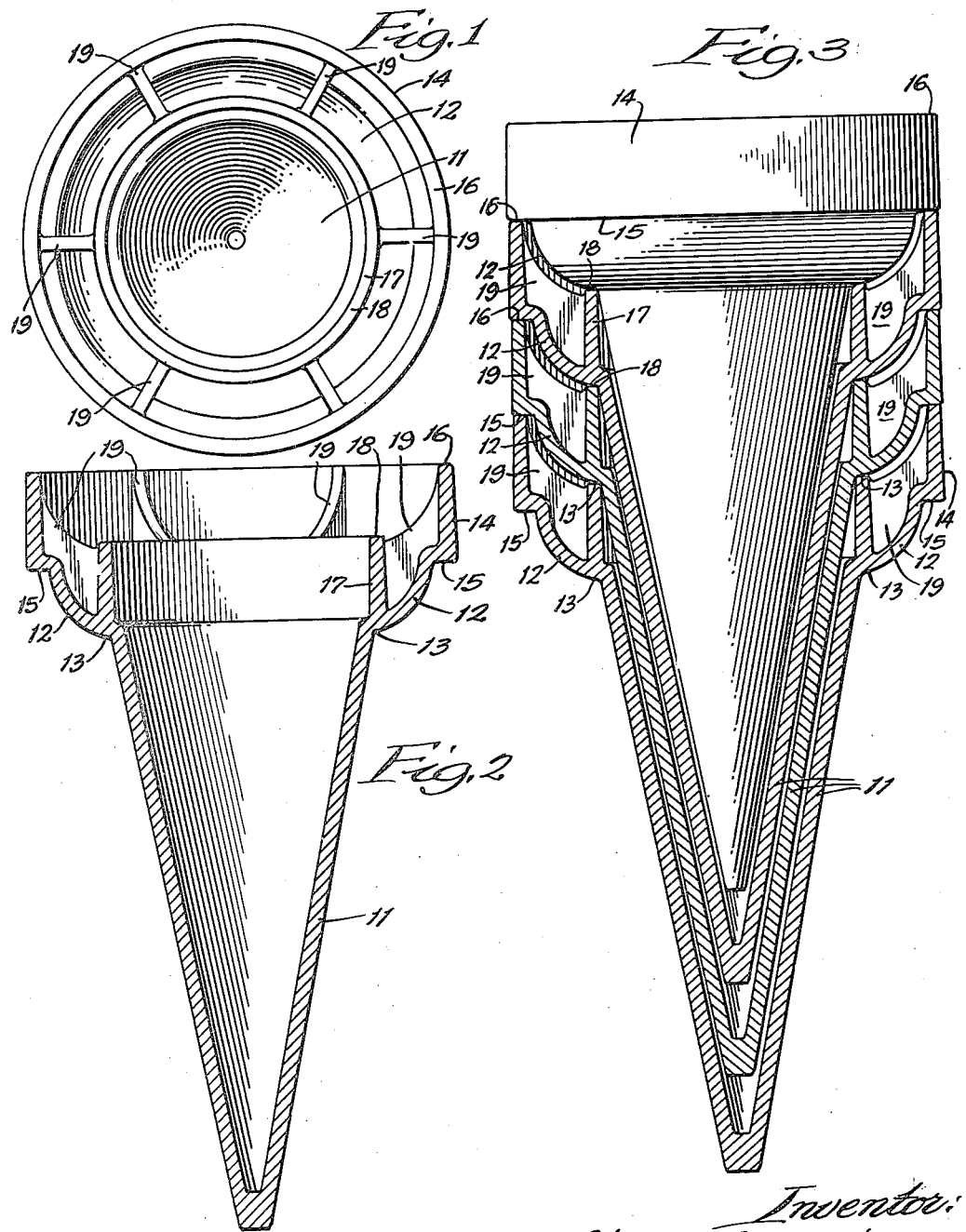
Inventor:
Walter E. Amberg,
By Dawson, Ooms, Booth and Spangenberg,
Attorneys.

Patented Aug. 17, 1948

2,447,045

UNITED STATES PATENT OFFICE 2,447,045

ICE-CREAM CONE

Walter E. Amberg, Beverly Shores, Ind., assignor to Arthur S. Bowes, Chicago, Ill.

Application December 22, 1947, Serial No. 793,107

7 Claims. (Cl. 99—89)

This invention is of an ice cream cone and has as its object the creation of an ice cream cone which is designed to have great strength with the use of minimum materials, and to provide features which enable it to be nested within other cones of the same type in the smallest possible space and with the greatest possible bearing contact for a cone of its size.

Heretofore most ice cream cones have been designed to be nested together but all have required the provision of special nesting rings to be embossed upon the inner or outer surfaces of the cone. Because of the conventional shape of ice cream cone bowls, the provision of a nesting ring in relation to the conventional ice cream bowl has usually resulted in a problem of providing a great deal of space for the nesting of a stack of cones. The cone of this invention requires no nesting ring and provides a reinforced cone mouth and substantial reinforcement within the cone bowl to produce an extremely strong structure.

This is accomplished with an attendant increase of the supporting surfaces of adjacent cones which bears against each other when the cones are nested and with a bowl construction of greater strength than has been heretofore available. This is also accomplished without any great departure from the conventional form of ice cream cone bowl and within the conventional size limits of the standard ice cream cone.

The invention not only accomplishes these objects but provides a substantially greater bearing surface of the cone bowl within the carton within which the cones are normally stacked, and thus prevents any destructive motion of the stacked cones within the package.

These and other features of the invention will be seen from the following detailed specification read in connection with the accompanying drawings forming part thereof and in which—

Figure 1 is a plan view of the ice cream cone of this invention looking into the bowl;

Fig. 2 is a vertical section of the cone; and

Fig. 3 is an elevation of a plurality of the cones in stacked relation, the upper one shown in full elevation and the others in vertical section.

Referring to the drawings, the cone body is indicated by the numeral 11. It is of conventional size and taper. The body of the cone is substantially conical to the line 13 where it joins the flared bowl. The bowl is formed with a rounded shoulder portion 12 which rises from the junction line 13 to the lip portion 14 of the bowl. The lip portion 14 rises substantially vertically from the ledge 15 which forms an abrupt horizontal abutment and extends sufficiently outwardly to bring the inner surface of the lip portion substantially at the vertical plane at which the rounded shoulder portion 12 terminates. The lip portion 14 thus forms the outermost portion of the cone structure and is formed to provide the upper edge 16 which is the actual lip of the cone.

Within the cone body and rising from the rounded shoulder portion 12 at substantially the intersection of the shoulder portion with the cone body is the inner annular ring 17 which terminates in the upper edge 18 and lies in substantially the same vertical plane as the beginning portion of the shoulder 12.

Connecting the inner annular ring 17 with the lip portion 14 of the bowl are the radial ribs 19. The plurality of these radial ribs are used but the exact number is not critical.

The cone thus described as the preferred embodiment of the invention has all of the functional characteristics of the conventional cone. The inner annular ring 17 and the radial ribs 19 will support the serving of ice cream within the bowl and thus sustain it and receive any melted portions that run from the serving within the pockets formed by the radial ribs. In addition, the relationship of the substantially vertical lip portion 14 and the substantially vertical inner annular ring 17 to the outer configuration of the cone body is such that when the cones are stacked the upper edge of the inner annular ring 18 will bear against the shoulder portion directly adjacent the junction line 13 and the upper edge 16 of the lip portion 14 will bear against the horizontal ledge 15 of the adjacent cone and provide ring contact at both places, as shown in Fig. 3. As a result of this arrangement of parts, the stacked cones will form a substantially rigid stack with extensive lines of contact between the lip portions of the stacked cones and any carton in which they may be packed.

It is to be observed that the cone also permits the conventional practice of stacking adjacent cones without the cone bodies being in contact, and, therefore, without the danger of wedging of adjacent cones.

Obviously the proportions of the various parts of the cone bowl may be modified to some extent without violating the principle of the structure herein disclosed.

Having thus shown and described one embodiment of the invention, it is to be understood that it is capable of many modifications. Changes, therefore, in the construction and arrangement may be made without departing from the spirit and scope of the invention as disclosed in the appended claims, in which it is intended to claim all novelty inherent in the invention as broadly as permissible, in view of the prior art.

I claim as my invention:

1. An ice cream cone adapted to be stacked in telescoped relation with similar cones comprising a conical body surmounted by a flared bowl formed of two concentric substantially vertical flanges connected at their lower edges by an exterior rounded shoulder portion and by a plurality of radial ribs extending between the flanges, the inner flange being of such height that the upper edge thereof will bear against the lower edge of the outer flange of an adjacent cone telescoped into the cone.

2. An ice cream cone comprising a conical body surmounted by a flared bowl, the bowl comprising a rounded shoulder portion, a substantially circular lip portion rising substantially vertically therefrom and forming a substantially horizontal shoulder at the junction thereof, and an inner annular ring rising substantially vertically from the interior of the shoulder portion, and a series of internal radial ribs connecting the lip portion with the inner annular ring.

3. An ice cream cone comprising a conical body surmounted by a flared bowl, the bowl comprising a rounded shoulder portion, an annular lip portion rising substantially vertically from the shoulder portion, the inner surface of the lip portion lying substantially in the same vertical plane as the upper outer edge of the shoulder portion, an inner annular ring rising substantially vertically from the interior of the shoulder portion, the inner surface of the ring lying substantially in the same vertical plane as the junction of the outer surfaces of the cone body and shoulder portion, and a plurality of radial ribs connecting the lip portion with the inner annular ring.

4. An ice cream cone adapted to be stacked in telescoped relation with similar cones comprising a conical body surmounted by a flared bowl, the bowl comprising a rounded shoulder portion, an outwardly extending horizontal ledge, an annular lip portion rising substantially vertically from the horizontal ledge, the inner surface of the lip portion lying substantially in the same vertical plane as the outer upper edge of the rounded shoulder portion, an inner annular ring rising substantially vertically from the interior of the shoulder portion, the inner surface of the ring lying substantially in the same vertical plane as the junction of the outer surfaces of the cone body and the rounded shoulder portion, the upper edge of the inner ring being adapted to seat the rounded shoulder portion of a cone telescoped into the cone, and the upper edge of the lip portion adapted to seat the horizontal ledge of a cone telescoped into the cone, and a plurality of radial ribs connecting the inner ring with the lip portion.

5. An ice cream cone adapted to be stacked in telescoped relation with similar cones comprising a conical shank surmounted by a flared bowl formed of two concentric inner and outer substantially vertical flanges connected at their lower edges by an exterior rounded shoulder portion and by a plurality of radial ribs extending between the flanges, said flared bowl being adapted to telescope within an adjacent similar cone to the extent that the rounded shoulder portions of a plurality of adjacent cones are completely enclosed within the adjacent bowls and the respective outer flanges of adjacent cones make peripheral contact with each other.

6. An ice cream cone adapted to be stacked in telescoped relation with similar adjacent cones, comprising a conical body surmounted by a flared bowl, the bowl comprising a flaring shoulder portion and a substantially circular top portion rising substantially vertically therefrom and forming a substantially horizontal abutment at the junction thereof, said lip portion having a depth sufficient to receive the shoulder portion of an adjacent cone telescoped into the cone and to permit the horizontal abutment of the lip portion of the adjacent cone to rest upon the upper edge of the lip portion of the cone.

7. An ice cream cone adapted to be stacked in telescoped relation with similar adjacent cones, comprising a conical body surmounted by a flared bowl, the bowl comprising a flaring shoulder portion and a substantially vertical lip portion of sufficient depth to embrace the flaring shoulder portion of an adjacent cone telescoped therein.

WALTER E. AMBERG.

REFERENCES CITED

The following references are of record in the file of this patent:

UNITED STATES PATENTS

| Number | Name | Date |
|---|---|---|
| 1,783,799 | Kohr | Dec. 2, 1930 |
| 1,938,113 | Schoenfeld | Dec. 5, 1933 |
| 1,987,993 | Dicker | Jan. 15, 1935 |
| 2,155,106 | Twinbull | Apr. 18, 1939 |